Jan. 3, 1956 W. N. MATSON 2,729,260
SCREW LOCKED BY DEFORMING PIN
Filed Nov. 6, 1952
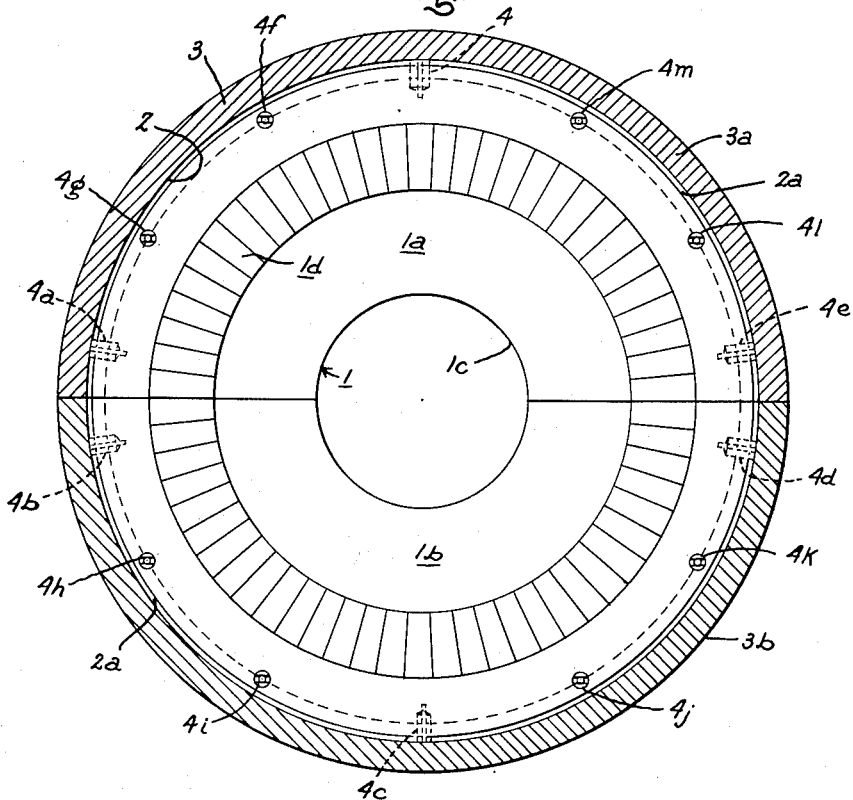
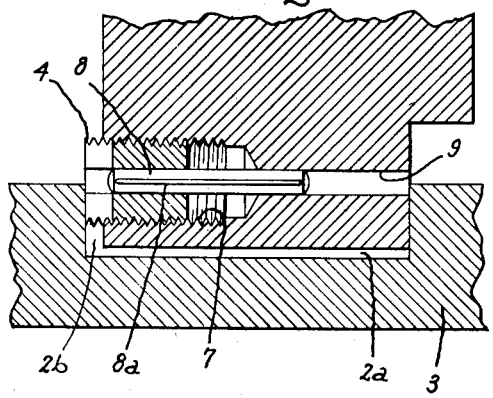
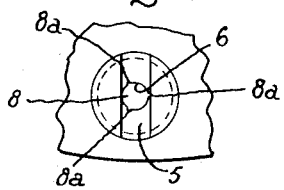
Inventor:
William N. Matson,
by Richard E. Hosley
His Attorney.

United States Patent Office 2,729,260
Patented Jan. 3, 1956

2,729,260

SCREW LOCKED BY DEFORMING PIN

William N. Matson, Fitchburg, Mass., assignor to General Electric Company, a corporation of New York Application November 6, 1952, Serial No. 319,151

1 Claim. (Cl. 151—67)

This invention relates broadly to an adjustable threaded plug member which must be locked in a carefully selected position relative to another machine member during assembly. More specifically, it concerns a special adjustable locked threaded member for properly positioning a turbine nozzle diaphragm relative to the turbine casing.

As will be appreciated by those skilled in the steam turbine art, the most usual steam turbine construction comprises a casing divided longitudinally, along a plane through the axis of the machine, into an upper and lower turbine casing half. Each casing section is provided with a plurality of axially spaced circumferentially extending grooves adapted to receive semi-circular disk members containing arcuate rows of nozzle diaphragm blades, there being one such nozzle diaphragm between each pair of adjacent bucket-wheels on the rotor. Because of the comparatively large size of the turbine casing and diaphragm sections, machining the outer circumference of the diaphragm to properly fit the groove in the casing presents substantial difficulties. Accordingly, it has been found expedient to provide rather substantial axial and radial clearance spaces between the periphery of the diaphragm and the walls of the casing groove, and then provide, at spaced locations around the circumference, locating means associated with the diaphragm and forming the desired class of fit with the casing groove walls. These locating means are of course so arranged as to support the diaphragm sections in proper concentric relation with the casing, and properly spaced axially relative to the cooperating bucket-wheels on the rotor.

Such diaphragm locating devices have taken many forms in the past. For instance, a hole may be drilled radially or axially into the circumferential portion of the diaphragm and a dowel pin of appropriate length driven into the hole. The projecting end is then carefully machined down, as by hand filing, until the proper fit and location of the diaphragm relative to the turbine casing is obtained. Another simple expedient is to merely add welding or brazing material to circumferential portions of the diaphragm, and then carefully file down these "blobs" of added material until the desired dimension is obtained. This method is somewhat awkward, since any error in filing means that additional material must be brazed on and then refinished.

Accordingly, the object of the present invention is to provide an improved turbine diaphragm locating means which may be readily adjusted with great accuracy during assembly and then positively locked in the position required to position the diaphragm in the casing and give the class of fit desired.

A further object is to provide an improved means for locking in adjusted position relative to another machine member a threaded plug member.

Other objects and advantages will become apparent from the following description taken in connection with the accompanying drawings, in which Fig. 1 is a transverse view, partly in section, of the two halves of a steam turbine diaphragm supported in proper position in a split turbine casing, Fig. 2 is a sectional detail view of the special adjustable threaded plug member which determines the axial location and fit of the diaphragm in the casing groove, Fig. 3 is a detail end view of the adjustable member of Fig. 2, and Fig. 4 is another sectional detail showing the adjustable locating member arranged to provide proper concentric relation between the casing and diaphragm.

Generally stated, the invention is practiced by providing a cylindrical threaded plug member which is adjustably screwed into a cooperating hole in the circumferential portion of the diaphragm, until the plug member projects from the diaphragm just the right amount required to properly locate the diaphragm in the casing groove and provide the desired class of fit with the walls of the groove. The adjustable plug is then locked in position by a hardened ribbed pin, which is driven through an axial hole in the plug and into a cooperating hole in the diaphragm.

Referring now more particularly to Fig. 1, the turbine diaphragm is indicated generally at 1 as comprising an upper half 1a and lower half 1b. These two half sections are received in a circumferential groove 2 formed in the turbine casing 3, which is of course divided along a horizontal plane into an upper half 3a and a lower half 3b. The diaphragm defines a comparatively large central opening 1c adapted to surround the turbine rotor shaft carrying the bucket-wheels (not shown) to which motive fluid is admitted to the circumferential row of nozzles 1d.

As indicated above, the present invention relates to the special means provided for properly locating and obtaining the class of fit of the diaphragm relative to the casing groove 2. As will be seen by a comparison of Figs. 1, 2, and 4, the circumferential portion of the diaphragm forms rather substantial axial and radial clearances with the walls of the casing groove 2. The radial clearance is identified 2a and the axial clearance is identified 2b.

As will be apparent from Fig. 1, the adjustable plug members for locating the diaphragm radially are identified 4, 4a, 4b, 4c, 4d, 4e. It will be obvious that each diaphragm half has three locating plugs arranged to positively insure proper concentricity between the diaphragm and the rotor. Those skilled in the art will of course appreciate that these locating plugs may be fewer or greater in number and may be located otherwise than as shown in the drawing.

The axial locating means comprise similar threaded plug members 4f, 4g, 4h, 4i, 4j, 4k, 4l, 4m. Here again the number and location of the plugs may be different than as shown in Fig. 1.

The details of the locating plug members are shown clearly in Fig. 2. Each plug 4 comprises a cylindrical member having an external thread throughout the length thereof and a transverse slot 5 across the external end thereof. Extending axially through the plug is a central drilled hole 6. It will be readily apparent in Figs. 2 and 4 that the plug 4 is adjustably threaded into a drilled hole 7 in the circumferential portion of the casing, hole 7 being sufficiently deep to provide the necessary range of adjustment. Since the plug must be very accurately positioned to perform its locating and fitting function, it is necessary to provide means for positively locking the plug in its adjusted position. To this end a locking pin 8 is forcibly driven into the axial hole 6 and into a cooperating hole 9 drilled in the diaphragm. The locking pin has a plurality of circumferentially spaced ribs 8a, which bite into the walls of the aligned holes 6 and 9 respectively, thus preventing accidental relative rotation between the plug 4 and the diaphragm 1.

It will of course be obvious that the locking pin must be of sufficiently harder material than the plug 4 and diaphragm 1 as to cause deformation of the bore of the plug and diaphragm instead of simply flattening out the ribs 8a. The locating plugs may be conveniently made of ordinary mild steel and the turbine diaphragm will also be of mild steel. The pins 8 are conveniently made of a harder alloy such as a suitable bronze or a harder steel.

The method of use of this improved locating and fitting device is as follows. After the circumferential portion of the diaphragm and the cooperating grooves in the casing are suitably machined, the mechanic carefully measures the axial width of the groove in the casing with an inside calipers and transfers this axial dimension to an outside calipers. He then screws the plug 4 into the bore 7 as shown in Fig. 2, until the plug projects just the right amount to make the overall axial dimension of diaphragm and plug correspond to the axial width of the groove, to the degree required to give the desired class of fit when the diaphragm is installed in the casing. Then, with a suitable tool engaging the transverse end slot 5 in the plug, to prevent further accidental rotation thereof, the workman runs a drill through the axial hole 6 in the plug and drills the cooperating hole 9 in the diaphragm. This insures that holes 6 and 9 will properly line up. The ribbed locking pin 8 is then driven into the hole 6 so that the ribs 8 cut grooves in the bore of the plug and in the cooperating bore 9 in the diaphragm.

Thus the invention provides a simple locating means which is conveniently adjusted in assembly to very precise dimensions and then is positively locked by the simple operation of driving in the locking pin.

Fig. 4 illustrates the locked plug arrangement as applied to the concentricity-determining means. The method of assembly is precisely as outlined above.

Thus it will be seen that the invention provides novel means for adjusting a steam turbine diaphragm so as to provide accurate concentricity with the rotor and also give the desired class of fit with the side walls of the casing groove.

While only one specific form of the invention has been described in detail herein, it will be obvious that certain modifications may be made without departing from the spirit of the invention, and it is desired to cover by the appended claims all such modifications as fall within the true spirit and scope of the invention.

What I claim as new and desire to secure by Letters Patent of the United States is:

In combination with a first machine member defining a threaded hole, a threaded cylindrical member disposed in said threaded hole, the cylindrical member having an external thread extending the length thereof and a central axial cylindrical hole extending entirely therethrough, a cylindrical hole defined by the first member in alignment with said axial hole, and means for locking said cylindrical member relative to said first machine member, said means comprising a generally cylindrical locking pin member constructed of a harder material than said first machine member and cylindrical member, the pin member defining axially extending ribs having an outer diameter slightly greater than the diameters of the aligned cylindrical hole and axial hole defined by the first member and threaded cylindrical member respectively, the pin being driven into place with said ribs deformably engaging the walls of both said aligned holes, whereby the cylindrical member may be adjusted by appropriate rotation relative to the first machine member and then locked in said position by driving the ribbed pin through the hole in the cylindrical member and into the aligned hole in the first member.

References Cited in the file of this patent

UNITED STATES PATENTS

| | | |
|---|---|---|
| 1,365,869 | Temple | Jan. 18, 1921 |
| 1,873,743 | Doran | Aug. 23, 1932 |
| 2,247,378 | Hinrichs | July 1, 1941 |
| 2,400,348 | Greene | May 14, 1946 |
| 2,532,815 | Kindsvatter | Dec. 5, 1950 |

FOREIGN PATENTS

| | | |
|---|---|---|
| 392,491 | Germany | Mar. 26, 1924 |